(12) United States Patent
Runco (10) Patent No.: US 6,755,540 B1
(45) Date of Patent: Jun. 29, 2004

(54) LENS SHIFTING APPARATUS

(76) Inventor: Virgil Sam Runco, 1118 Blythe St., Foster City, CA (US) 94404-3604

( * ) Notice: Subject to any disclaimer, the term of this patent is extended or adjusted under 35 U.S.C. 154(b) by 0 days.

(21) Appl. No.: 10/316,380

(22) Filed: Dec. 11, 2002

(51) Int. Cl.$^7$ ................................................ G03B 21/14
(52) U.S. Cl. ........................................ 353/101; 353/70
(58) Field of Search .......................... 353/70, 100, 101; 359/813, 822

(56) References Cited

U.S. PATENT DOCUMENTS

| | | | | |
|---|---|---|---|---|
| 5,194,993 | A | * 3/1993 | Bedzyk | ........................ 359/813 |
| 5,465,126 | A | * 11/1995 | Fukuda | ........................ 353/101 |
| 6,310,726 | B1 | 10/2001 | Iizuka | |
| 2001/0019398 | A1 | * 9/2001 | Agata | ........................ 353/100 |
| 2002/0044264 | A1 | * 4/2002 | Lu | ........................ 353/101 |
| 2002/0154278 | A1 | * 10/2002 | Masuda | ........................ 353/101 |

OTHER PUBLICATIONS

VX–1000c Projector and PFP Controller, Owner's Operating Manual, Runco Corporation, Jul. 2002.
VX–5000c Projector and PFP Controller, Owner's Operating Manual, Runco Corporation, May 2002.
VT45 LCD Projector, User's Manual, NEC, 2001.
VT45, Product Details, NEC, www.necvisualsystems.com.
Runco press releases, Reflection VX–3c, Sep. 2000, www.runco.com/AboutUS/Press/2000/vx3c.htm.
Runco Reflection VX–5000c, 2002, www.runco.com/Product/DLP/VX5000c.htm.

* cited by examiner

Primary Examiner—William C. Dowling
(74) Attorney, Agent, or Firm—Kirkpatrick & Lockhart LLP (57) ABSTRACT

Image projector having a selectively shiftable projector lens assembly and apparatus for selectively shifting a projector lens assembly. In one embodiment, the image projector may include a projector housing, a light engine supported by the projector housing, and a projector lens assembly supported by the projector housing. The projector lens assembly defines an optical axis and is oriented relative to the light engine for receiving and projecting light emitted by the light engine. In one embodiment, the lens shifting apparatus may include a first plate movably coupled to the projector housing and supporting the projector lens assembly. The first plate may be selectively movable along a first axis perpendicular to the optical axis. The first plate may be movably coupled to a second plate which is movably supported by the projector housing for selective travel about a second axis that is perpendicular to the optical axis and the first axis.

52 Claims, 9 Drawing Sheets

LENS SHIFTING APPARATUS

BACKGROUND OF THE INVENTION

Recent developments in theater and wide-screen home-theater projection systems include the development of Digital Light Processing ("DLP") projectors. Unlike the older Cathode Ray Tube ("CRT") projectors, the DLP projectors do not include coated tubes, but instead generate images by beaming light from a lamp to a surface of a Digital Micromirror Device ("DMD"). The DMD is commonly housed in a light engine portion of the DLP projector. The DLP projectors are relatively compact in comparison with their CRT counterparts and can produce high quality images without grainy scan lines when images from a standard video source are enlarged to fill a large screen.

U.S. Pat. No. 6,310,726 B1 discloses an image-projecting device that includes a relay lens that is capable of being shifted in at least one direction that is perpendicular to the optical axis of the device.

Japanese Patent Publication 05-027324 also discloses a projection-type display device with a lens moving mechanism that moves a condensing lens and a projecting lens. The lens moving mechanism includes two screw shafts rotatably interconnected with a belt and pulleys. Torque is transmitted to one of the screw shafts by a bevel gear system.

SUMMARY

One embodiment of the invention provides an image projector having a selectively shiftable projector lens assembly. Another embodiment of the invention provides an apparatus for selectively shifting a projector lens assembly. In one embodiment, the image projector may include a projector housing, a light engine supported by the projector housing, and a projector lens assembly supported by the projector housing. The projector lens assembly defines an optical axis and is oriented relative to the light engine for receiving and projecting light emitted by the light engine. In one embodiment, the lens shifting apparatus may include a first plate movably coupled to the projector housing and supporting the projector lens assembly. The first plate may be selectively movable along a first axis perpendicular to the optical axis. The first plate may be movably coupled to a second plate which is movably supported by the projector housing for selective travel about a second axis that is perpendicular to the optical axis and the first axis.

BRIEF DESCRIPTION OF THE DRAWINGS

In the accompanying Figures, there are shown present embodiments of the invention wherein like reference numerals are employed to designate like parts and wherein.

DETAILED DESCRIPTION OF THE INVENTION

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity. In addition, it will be appreciated that the characterizations of various components and orientations described herein as being "vertical" or "horizontal", "right" or "left", "side", "top" or "bottom", are relative characterizations only based upon the particular position or orientation of a given component for a particular application.

Figure 1:
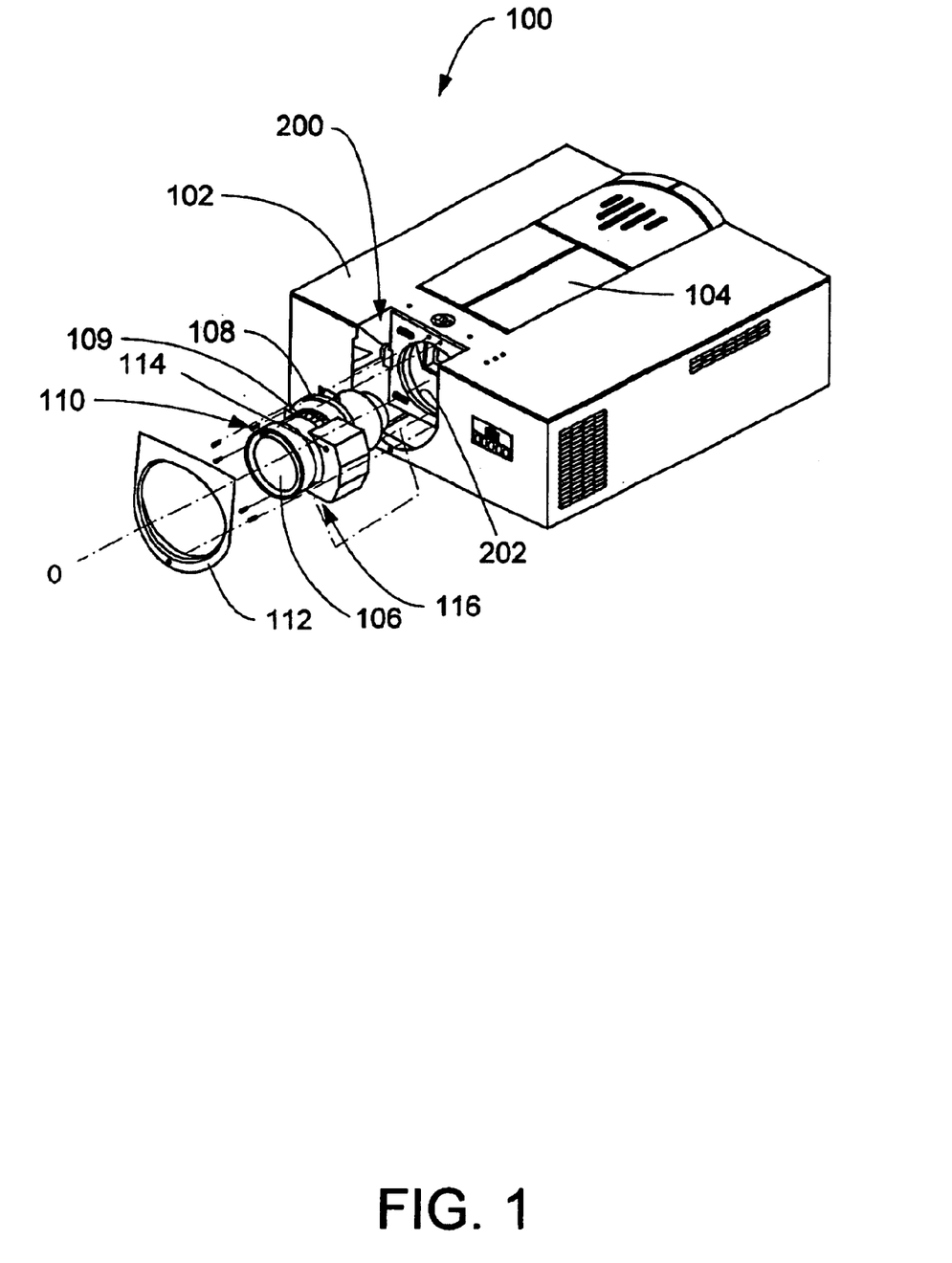
FIG. 1 is a partially exploded perspective view of an embodiment of a projector according to the present invention.

FIG. 1 depicts an embodiment of an image projector 100. The image projector 100 may include a projector housing 102, a light engine 104 and a projector lens assembly 106 that defines an optical axis O—O. The projector lens assembly 106 may be motorized and also include a front ring 112 that is removably mounted to the front of the projector lens assembly 106, a motor assembly 114 and a motor assembly connector 116. The projector lens assembly 106 may be movably supported on the projector housing 102 by a lens shifting apparatus 200 of the present invention. The basic construction and operation of the light engine 104, projector lens assembly 106 and the motor assembly 114 are known in the art and therefore will not be discussed in great detail herein beyond what may be necessary to better appreciate the various embodiments of the present invention.

Figure 2:
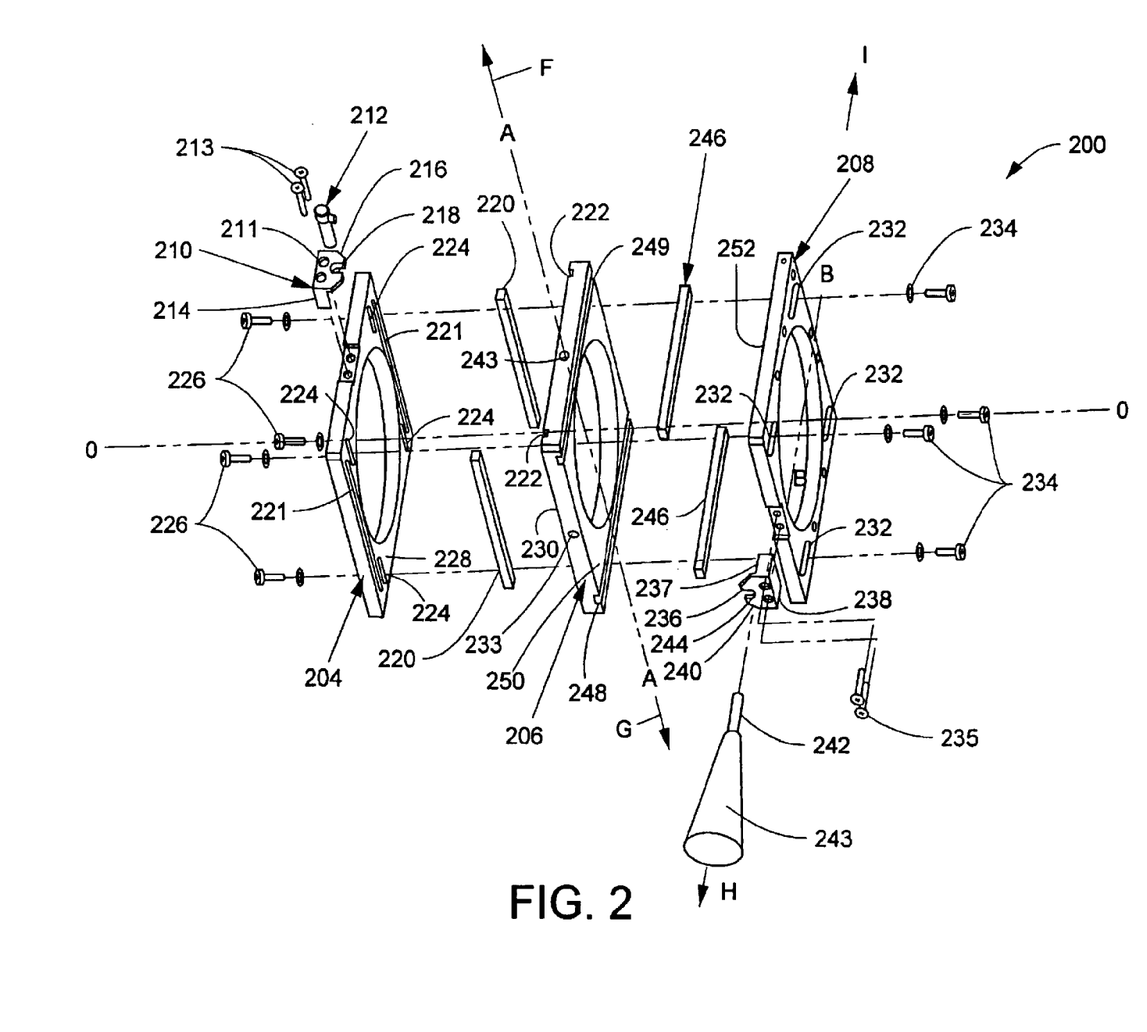
FIG. 2 is a partially exploded assembly view of an embodiment of a lens shifting apparatus for the projector of FIG. 1.
Figure 3:
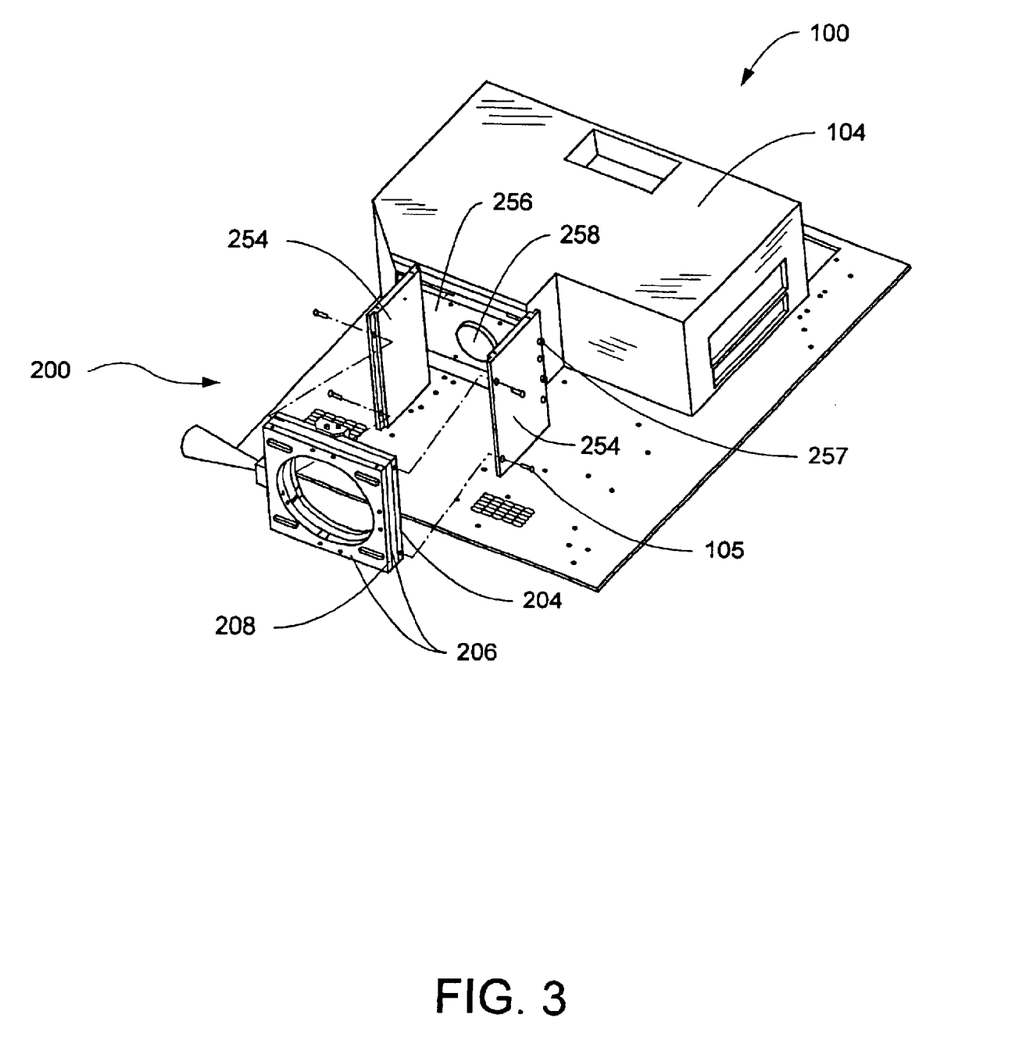
FIG. 3 is a partially exploded perspective view showing the light engine portion of the projector of FIG. 1.

As shown in FIGS. 2 and 3, one embodiment of the lens shifting apparatus 200 may include a base plate 204 that is mounted to the projector housing 102 for movably supporting a first plate 206 and a second plate 208 thereon. The first plate 206 may be slidably coupled to the base plate 204 such that the first plate 206 may slide relative to the base plate 204 in two directions (represented by arrows "F" and "G" in FIG. 2) along a first axis A—A, which is substantially perpendicular to optical axis O—O. The base plate 204 may include a plurality of elongated fastener slots 224 that are parallel to the first axis A—A. Fasteners 226 in the form of, for example, shoulder screws may pass through the fastener slots 224 to interconnect the base plate 204 to the first plate 206 while permitting sliding motion of the first plate 206 relative to the base plate 204 along the first axis A—A.

To selectively facilitate travel of the first plate 206 relative to the base plate 204 in the "F" and "G" directions, a first positioning assembly 210 may be employed. In one embodiment, the positioning assembly 210 may comprise a first bracket 211 that supports a first actuator such as, for example, a cap or lead screw 212. More specifically, as can be seen in FIG. 2, the first bracket 211 may be configured to include a web 214 and a flange 216. The web 214 of the first bracket 211 may be attached to the base plate 204 with fasteners 213, such as bolts or screws or other fastener arrangements. The first actuator or lead screw 212 is rotatably cradled in an open-ended slot 218 provided in the flange 216. The threaded end of the lead screw 212 is threaded into a corresponding threaded hole 243 in the first plate 206 such that by rotating the lead screw 212 in clockwise or counterclockwise directions, the first plate 206 is caused to move in opposite directions indicated by the arrows "F" and "G" along the first axis A—A. It will therefore be understood that motion along the axis A—A may be achieved by manually rotating the lead screw 212 with an appropriate wrench or tool. However, those of ordinary skill in the art will appreciate that a motorized lead screw 212 driven by a motor 203 could also be similarly employed to selectively adjust the position of the first plate 206 relative to the base plate 204 along axis A—A without departing from the spirit and scope of the present invention.

Figure 8:
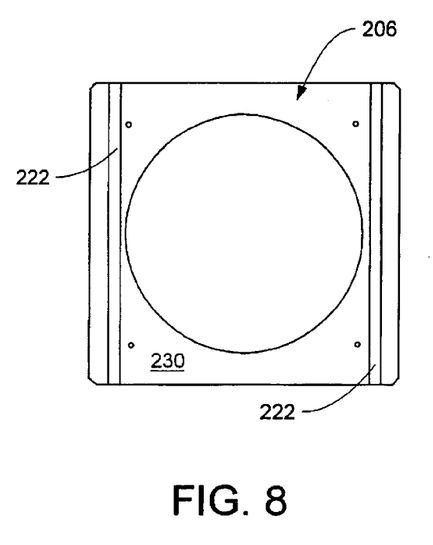
FIG. 8 is a rear view of an embodiment of a first plate for the lens shift apparatus of FIG. 2.
Figure 9:
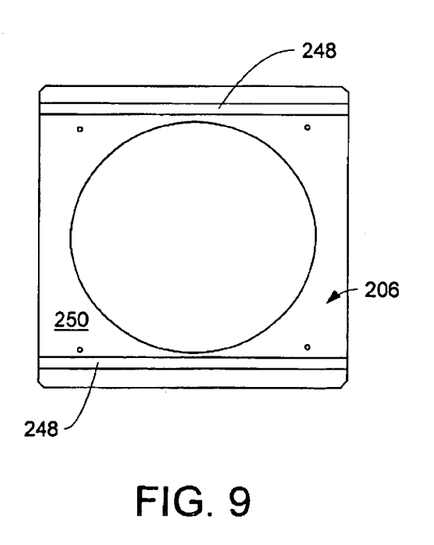
FIG. 9 is a front view of the first plate of FIG. 8.

To provide the first plate 206 with sliding support relative to the base plate 204 along the first axis A—A while preventing relative travel transverse to this axis, a pair of spaced-apart first glide bars 220 may be interpositioned between the upper surface 228 of the base plate 204 and the lower surface 230 of the first plate 206. In one embodiment, the glide bars 220 are supported in corresponding elongated first glide grooves 221 provided in the upper surface 228 of base plate 204. The first glide bars 220 may be fabricated from self-lubricating material, such as Delrin®, and are sized to be non-movably supported in the first glide grooves 221. Likewise, corresponding first glide slots 222 are provided in the lower surface 230 of the first plate 206 for slidably receiving the corresponding first glide bars 220 therein. Thus, when the first glide bars 220 are received in the corresponding first glide grooves 221 and first glide slots 222, the first plate 206 can only move along axis A—A relative to the base plate 204. See FIGS. 2, 8 and 9.

The second plate 208 may be similarly attached to the first plate 206 such that the second plate 208 can selectively slide relative to the first plate 206 along the direction of a second axis B—B, which is perpendicular to the direction of the optical axis O—O. The second axis B—B may be transverse to the first axis A—A, as shown in FIG. 2. The second plate 208 may include a plurality of fastener slots 232 that are parallel to the second axis B—B. A plurality of fasteners 234 such as shoulder screws may pass through the second plate fastener slots 232 to interconnect the second plate 208 to the first plate 206 while permitting sliding motion of the second plate 208 relative to the first plate 206 along the second axis B—B. See FIGS. 2, 8 and 9. Thus when the first plate 206 is moved along the first axis A—A, the second plate 208 travels therewith along the first axis A—A.

To selectively facilitate travel of the second plate 208 relative to the first plate 206 in opposite directions "H" and "I" along the second axis B—B, a second positioning assembly 236 may be employed. In one embodiment, the second positioning assembly 236 comprises a second bracket 237 that includes a web 238 and a flange 240. See FIG. 2. The web 238 of the second bracket 237 may be attached to the second plate 208 with threaded or similar fasteners 235. A second actuator 242, such as, for example, a threaded cap or lead screw, may be rotatably cradled in an open-ended slot 244 provided in the flange 240. The threaded end of the lead screw 242 is threaded into a hole 233 in the first plate 206. Rotating the second actuator 242 clockwise and counterclockwise will cause the second plate 208 to move in opposite directions H and I along the axis B—B. It will therefore be understood that motion along the second axis B—B may be achieved by manually rotating the lead screw 242 with an appropriate wrench or tool. However, those of ordinary skill in the art will appreciate that a motorized lead screw 242 driven by a motor 247 could also be similarly employed to selectively adjust the position of the second plate 208 relative to the fist plate 206 along the second axis B—B without departing from the spirit and scope of the present invention. The second plate 208 and the base plate 204 may be identical and rotated 90 degrees relative to each other.

To facilitate actuation of the second lead screw actuator 242 when the lens shifting apparatus 200 is mounted to the projector housing 102, the second actuator 242 may be provided with a hollow tool guide 243 for permitting an appropriately sized wrench or tool to be inserted into engagement with the second actuator 242. The guide 243 may be nonmovably attached to the head of the second actuator lead screw 242, such as by welding, to guide the wrench or tool into the socket of the lead screw 242.

Figure 7:
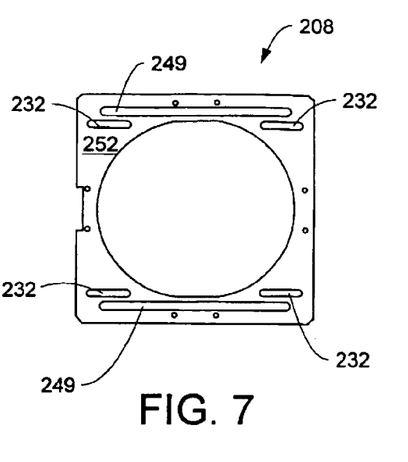
FIG. 7 is a rear view of the second plate of FIG. 6.

To provide the second plate 208 with sliding support in the "H" and "I" directions while preventing travel of the second plate 208 relative to the first plate 206 in the "F" and "G" directions, a pair of spaced-apart second glide bars 246 that are parallel to the second axis B—B are interpositioned between the upper surface 250 of the first plate 206 and the lower surface 252 of the second plate 208. The second glide bars 246 may be fabricated from self-lubricating material, such as Delrin®, and are sized to be non-movably supported in glide grooves 249 in the lower surface 252 of the second plate 208. Likewise, corresponding glide slots 248 are provided in the upper surface 250 of the first plate 206. Thus, when the second glide bars 246 are received in the corresponding second glide grooves 249 and the second glide slots 248, the second plate 208 is constrained to move with the first plate 206 in the "F" and "G" directions and to selectively move relative to the first plate 206 in the "H" and "I" directions. See FIGS. 2, 7 and 9.

The projector lens assembly 106 may be movably supported by the lens shifting apparatus 200 by means of an adapter ring 108 which has an opening 109 therethrough for receiving the projector lens assembly 106 therein. Fasteners, such as screws, may threaded through holes in the projector lens assembly 106 and be feed through the adapter ring 108 for attachment to the lens shifting apparatus 200. In one embodiment, the adapter ring 108 may be attached to the second plate 208 by fasteners 110. See FIG. 1. However, those of ordinary kill in the art will appreciate that a quick release bayonet system could also be employed to release the adapter ring 108 from the lens shifting apparatus 200.

Figure 10:
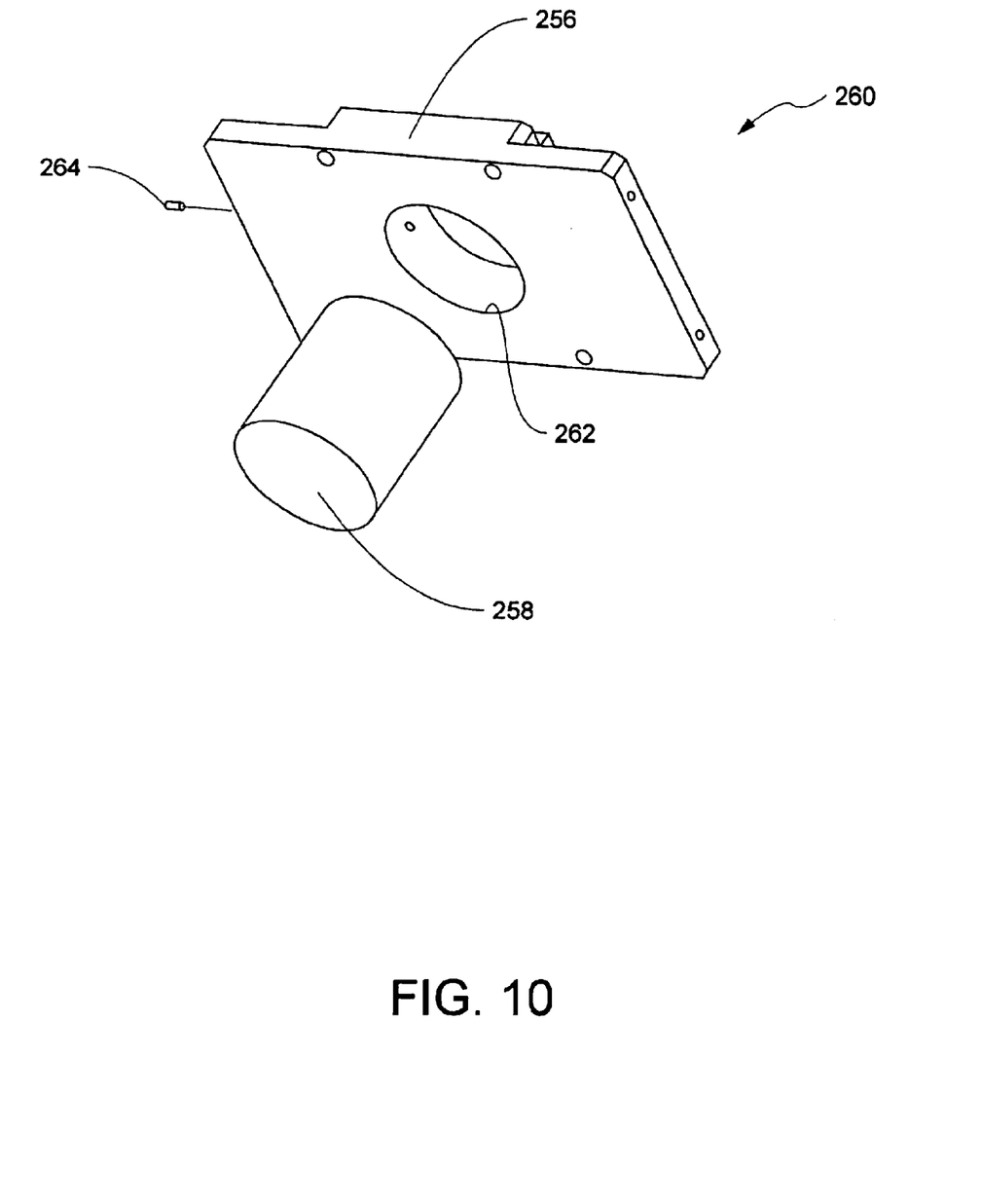
FIG. 10 is an exploded perspective view of a transfer lens assembly for the projector of FIG. 1.

Also, in one embodiment, to facilitate selective adjustment of the back focal length, which is the distance from the rear of the projector lens assembly 106 to the front of a DMD chip (not shown) in the light engine 104, a transfer lens assembly 260 may be employed. The transfer lens assembly 260 may include a transfer lens plate 256 that is centrally disposed between two side plates 254 that are coupled to the base plate 204 of the lens shifting apparatus 200 by conventional fasteners 105. See FIG. 3. Likewise, the transfer lens plate 256 may be coupled to the side plates 254 by conventional fastener arrangements such as threaded cap screws 257. In one embodiment, the transfer lens assembly may also be coupled to the housing of the light engine 104 to facilitate proper alignment to the DMD chip. In one embodiment, the transfer lens plate 254 has a centrally disposed opening 262 which is coaxially aligned on optical axis O—O and is sized to receive therein a lens block 258. See FIG. 10. The lens block 258 is a conduit of light and may be fabricated from, for example, optically transparent glass. The lens block 258 serves to move the projector lens assembly 106 further away from the projector light engine 104 and change the back focal length of the projector lens assembly to allow the use of larger lenses. The lens transfer block 258 may be adjustably retained in the lens plate 256 by, for example, a nylon-tipped set screw 264 or similar fastener to permit the position of the lens transfer block 258 relative to the lens plate 256 to be readily adjusted along the optical axis O—O. See FIG. 10.

Figure 4:
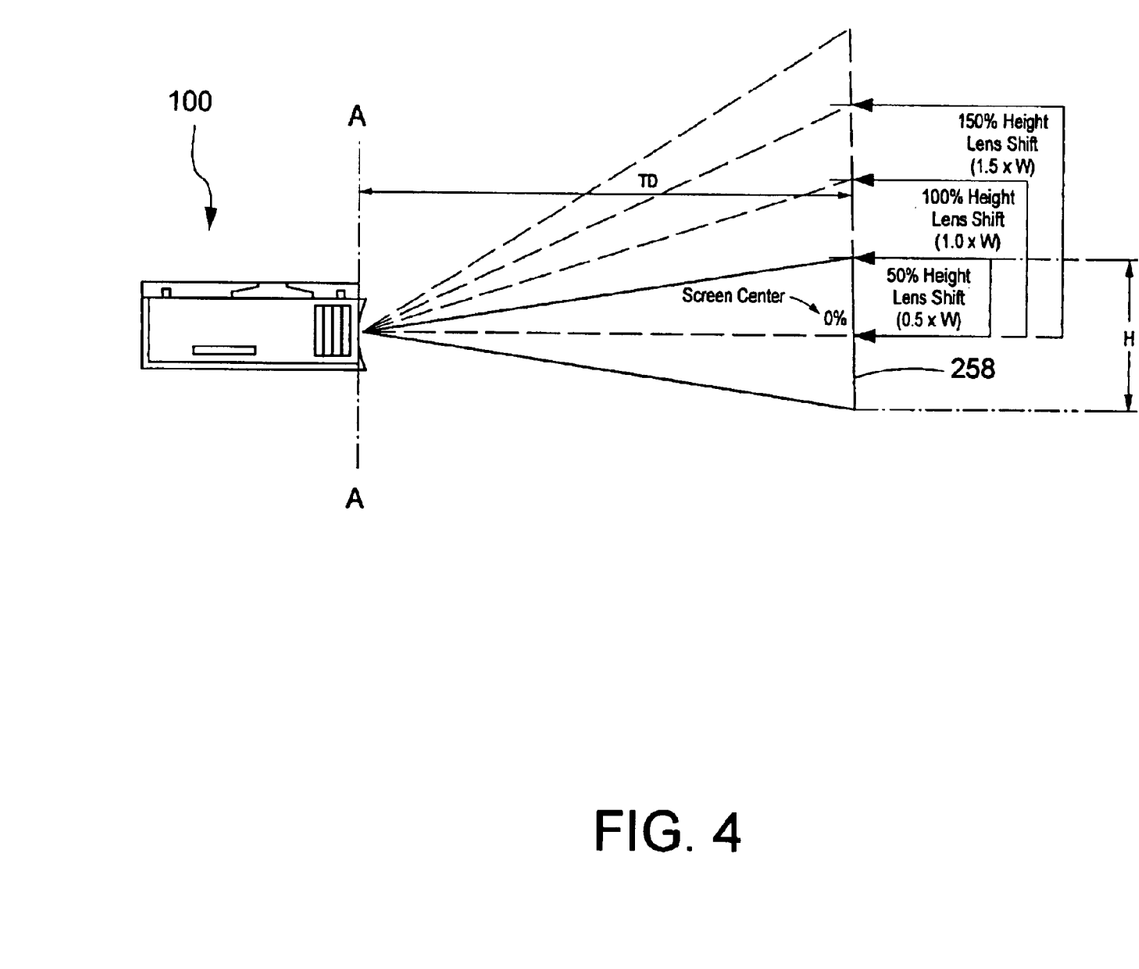
FIG. 4 is a side view of an embodiment of a ceiling-mounted projector according to the present invention showing examples of screen image shifts along a first axis A—A.
Figure 5:
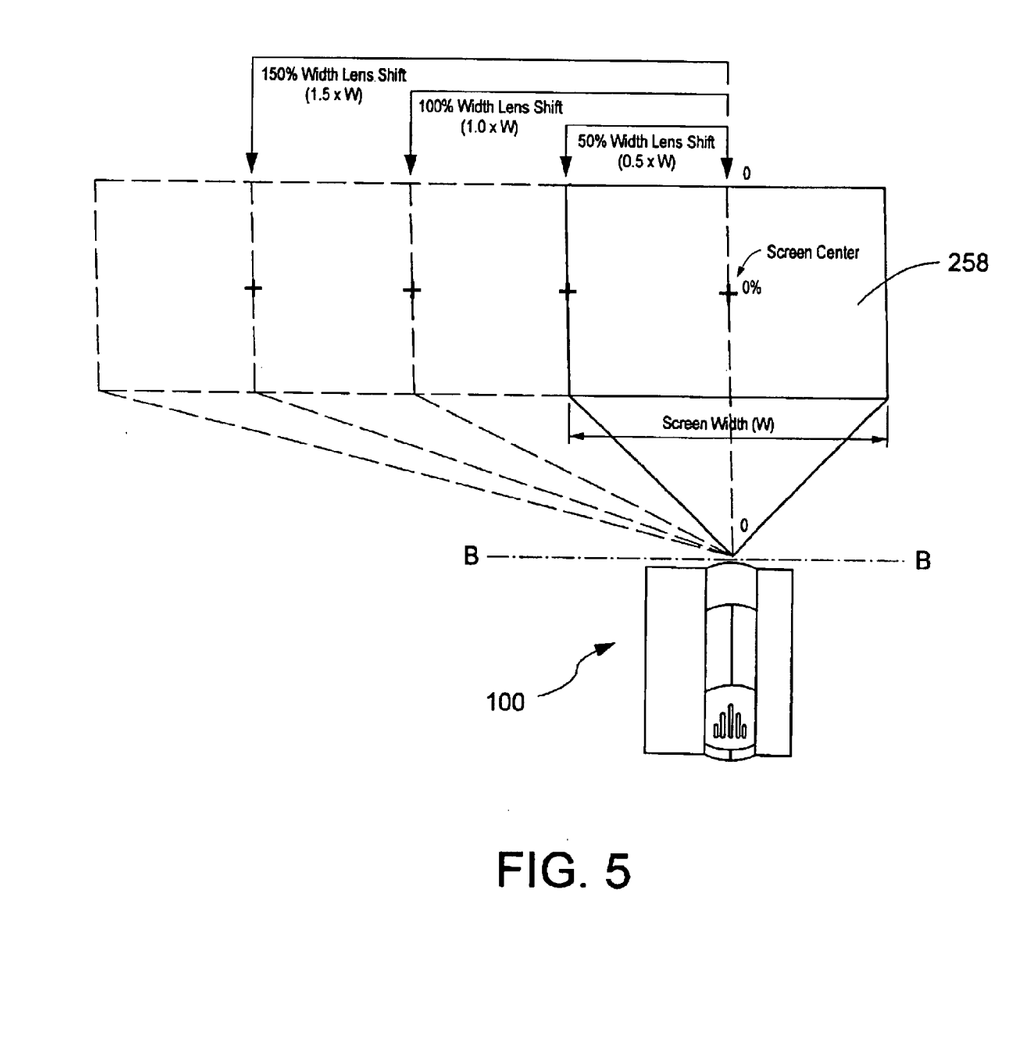
FIG. 5 is a top view of the projector of FIG. 4 showing examples of screen image shifts along a second axis B—B.
Figure 6:
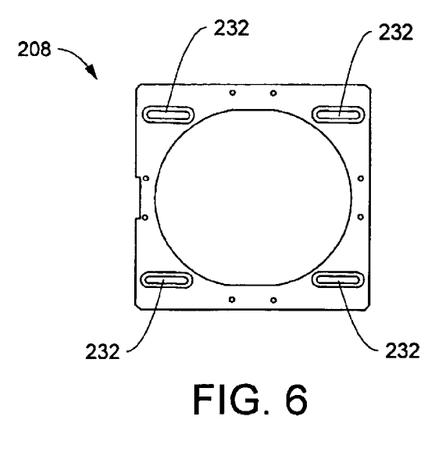
FIG. 6 is a front view of an embodiment of second plate for the lens shifting apparatus of FIG. 2.

Those of ordinary skill in the art will appreciate that the projector 100 may be advantageously used in connection with a projection screen 258 or similar planar surface. By way of example only, the projection screen 258 may have dimensions H and W in directions that coincide with the orientations of the first and second axes A—A and B—B, respectively. See FIGS. 4 and 5. Although the throw distance "TD", which is the distance from the projector lens assembly 106 to an object such as the screen 258, may not affect image quality, the range of the lens shift and the corresponding shift of the screen image projected to the screen 258 and magnified to the dimensions of the screen 258 may depend on the throw distance TD to achieve an image with desired quality. FIGS. 4 and 5 depict examples of 50%, 100% and 150% shifts of the screen image along the first axis A—A and the second axis B—B. These image shifts may be produced by a total lens shift of, for example, only one inch along each of the first and second axes A—A and B—B. The range of the lens shift is illustrated in the following Examples 1–4. Corresponding FIGS. 11–14 depict the location of the image position within the shaded area that represents the boundary for the lens shift.

EXAMPLE 1

Figure 11:
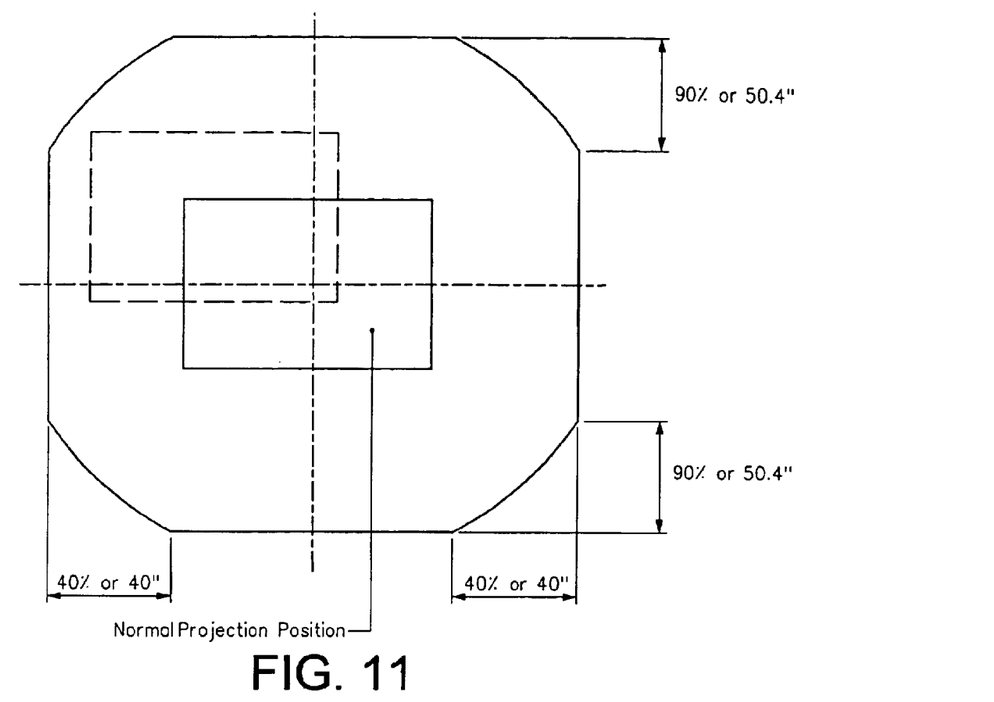
FIG. 11 is a diagram showing a first example of a lens shifting capability of a projector embodiment according to the present invention.

In this example, the throw distance is in the range of (1.57–1.95) times the dimension W of the screen along the second axis B—B. See FIG. 11. The maximum shift of the center of the screen image along the first axis is 90% of the corresponding dimension H of the screen image. The associated maximum shift of the center of the screen image along the second axis is 5% of the corresponding dimension W of the screen image. The maximum shift of the center of the screen image along the second axis is 40% of the corresponding dimension W of the screen image. The associated maximum shift of the center of the screen image along the first axis is 10% of the corresponding dimension H of the screen image. The maximum shift of the center of the screen image that may be obtained in two directions simultaneously, is 40% of the screen dimension H along the first axis A—A and 20% of the screen dimension along the second axis B—B. These results are illustrated in FIG. 11 for a screen with dimensions H=56" and W=100".

EXAMPLE 2

In this example, (illustrated in FIG. 12), the throw distance is in the range of (1.95 –2.74) times the dimension W of the screen along the second axis B—B.

Figure 12:
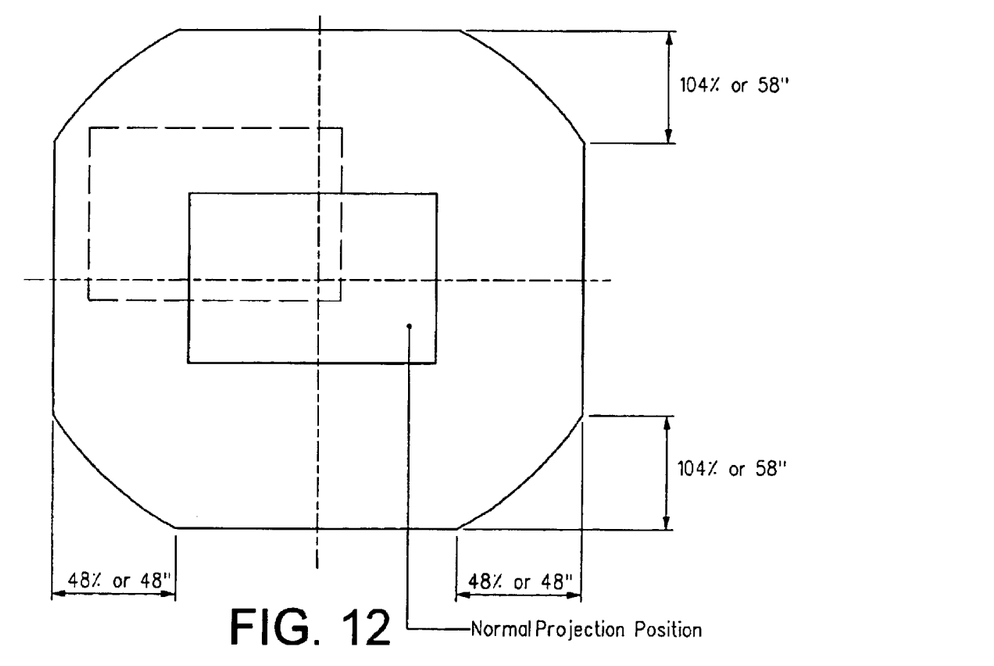
FIG. 12 is a diagram showing a second example of a lens shifting capability of a projector embodiment according to the present invention.

The maximum shift of the center of the screen image along the first axis is 104% of the corresponding dimension H of the screen image. The associated maximum shift of the center of the screen image along the second axis is 6% of the corresponding dimension W of the screen image. The maximum shift of the center of the screen image along the second axis is 48% of the corresponding dimension W of the screen image. The associated maximum shift of the center of the screen image along the first axis is 12% of the corresponding dimension H of the screen image. The maximum shift of the center of the screen image that may be obtained in two directions simultaneously, is 51% of the screen dimension H along the first axis A—A and 29% of the screen dimension along the second axis B—B. These results are illustrated in FIG. 12 for a screen with dimensions H=56" and W=100".

EXAMPLE 3

Figure 13:
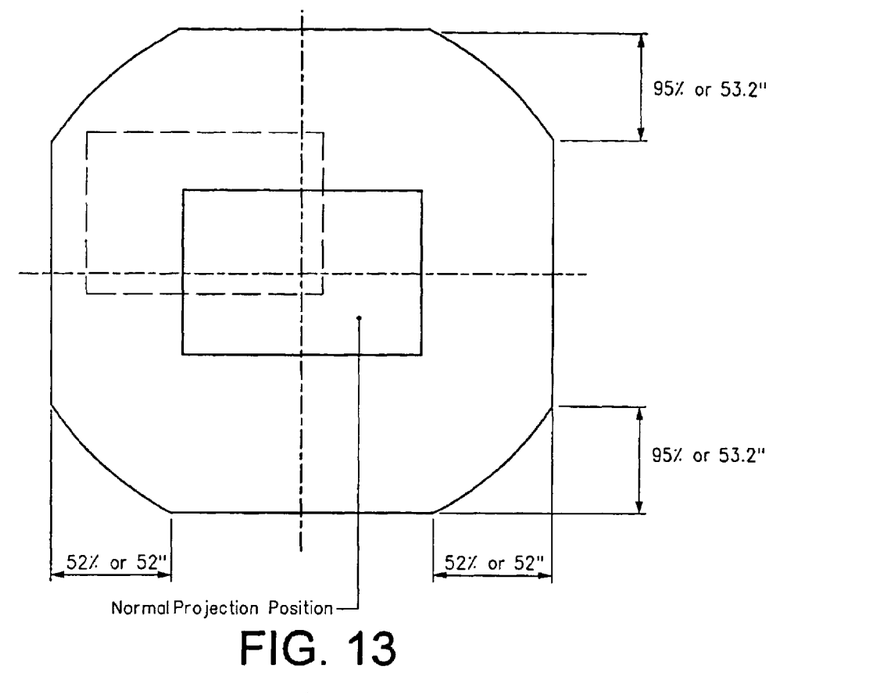
FIG. 13 is a diagram showing a third example of a lens shifting capability of a projector embodiment according to the present invention.

Referring to FIG. 13, in this example, the throw distance is in the range of (2.76–4.85) times the dimension W of the screen along the second axis B—B. The maximum shift of the center of the screen image along the first axis is 95% of the corresponding dimension H of the screen image. The associated maximum shift of the center of the screen image along the second axis is 7% of the corresponding dimension W of the screen image. The maximum shift of the center of the screen image along the second axis is 52% of the corresponding dimension W of the screen image. The associated maximum shift of the center of the screen image along the first axis is 24% of the corresponding dimension H of the screen image. The maximum shift of the center of the screen image that may be obtained in two directions simultaneously, is 48% of the screen dimension H along the first axis A—A and 31% of the screen dimension along the second axis B—B. These results are illustrated in FIG. 13 for a screen with dimensions H=56" and W=100".

EXAMPLE 4

Figure 14:
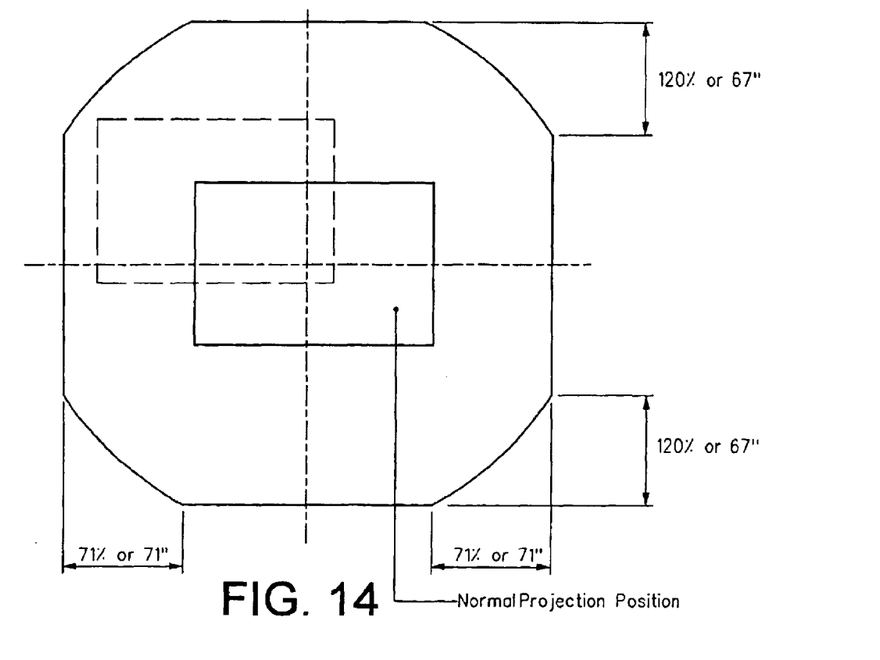
FIG. 14 is a diagram showing a fourth example of a lens shifting capability of a projector embodiment according to the present invention.

FIG. 14 illustrates yet another example. In this example, the throw distance is in the range of (4.85–7.75) times the dimension W of the screen along the second axis B—B. The maximum shift of the center of the screen image along the first axis is 120% of the corresponding dimension H of the screen image. The associated maximum shift of the center of the screen image along the second axis is 58% of the corresponding dimension W of the screen image. The maximum shift of the center of the screen image along the second axis is 71% of the corresponding dimension W of the screen image. The associated maximum shift of the center of the screen image along the first axis is 105% of the corresponding dimension H of the screen image. The maximum shift of the center of the screen image that may be obtained in two directions simultaneously, is 102% of the screen dimension H along the first axis A—A and 61% of the screen dimension along the second axis B—B. These results are illustrated in FIG. 14 for a screen with dimensions H=56" and W=100".

The projector 100 and lens shifting apparatus 200 of the present invention provide easily adjustable lens shift along two axes which are perpendicular to the optical axis O—O of the projector lens 106 and make possible the projection of large images on a screen without the need to center the projector relative to the image on the screen for substantially distortion-free images.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the spirit of the invention. The preceding description, limit the scope of the invention. Rather the scope of the invention is the appended claims and their equivalents.

What is claimed is:

1. An image projector comprising:
   a projector housing;
   a light engine supported by the projector housing;
   a projector lens assembly supported by the projector housing, the projector lens assembly having an optical axis and being oriented relative to the light engine for receiving and projecting light emitted thereby;
   a first plate movably coupled to the projector housing and supporting the projector lens assembly, the first plate being selectively movable along a first axis perpendicular to the optical axis;
   a second plate coupled to the projector housing; and
   at least one slide bar between the first plate and the second plate.

2. The image projector of claim 1, wherein the first plate is slidably supported relative to a base plate that is nonmovably supported by the projector housing.

3. The image projector of claim 1, wherein the second plate is movably supported relative to the first plate and supports the projector lens assembly thereon such that the second plate travels with the first plate upon movement of the first plate along the first axis, and wherein the second plate is selectively movable relative to the first plate along a second axis that is perpendicular to the optical axis and transverse to the first axis.

4. The image projector of claim 3, further comprising a first actuator operably connected to the first plate for shifting the first plate along the first axis.

5. The image projector of claim 3, further comprising a second actuator operably connected to the second plate for shifting the second plate along the second axis.

6. The image projector of claim 4, further comprising a second actuator operably connected to the second plate for shifting the second plate along the second axis.

7. The image projector of claim 2, further comprising a first pair of glide bars disposed between the base plate and the second plate parallel to the first axis.

8. The image projector of claim 1, wherein at least one glide bar is made of self-lubricating material.

9. The image projector of claim 7, wherein the first pair of glide bars is located between a first pair of glide grooves on a surface the base plate and a first pair of glide slots on a first opposing surface of the first plate.

10. The image projector of claim 2, wherein the base plate includes a plurality of fastener slots parallel to the first axis.

11. The image projector of claim 7, further comprising a second pair of glide bars that are disposed between the first plate and the second plate parallel to the second axis.

12. The image projector of claim 11, wherein the second pair of glide bars is located between a second pair of glide slots on a second surface of the first plate and a pair of glide grooves on an opposing surface of the second plate.

13. The image projector of claim 1, wherein the second plate includes a plurality of fastener slots parallel to the second axis.

14. The image projector of claim 1, wherein the first plate is slidably supported relative to the second plate, and the second plate is nonmovably supported by the projector housing.

15. The image projector of claim 1, further comprising a first pair of glide bars disposed between the first plate and the second plate parallel to the first axis.

16. The image projector of claim 15, wherein the first pair of glide bars is located between a first pair of glide grooves on a surface the second plate and a first pair of glide slots on a first opposing surface of the first plate.

17. An image projector comprising:
    a projector housing;
    a light engine supported by the projector housing;
    a projector lens assembly supported by the projector housing the projector lens assembly having an optical axis and being oriented relative to the light engine for receiving and projecting light emitted thereby;
    a first plate movably coupled to the projector housing and supporting the projector lens assembly, the first plate being selectively movable along a first axis perpendicular to the optical axis;
    a second plate movably supported relative to the first plate and supporting the projector lens assembly thereon such that the second plate travels with the first plate upon movement of the first plate along the first axis, and wherein the second plate is selectively movable relative to the first plate along a second axis that is perpendicular to the optical axis and transverse to the first axis; and
    a first actuator operably connected to the first plate for shifting the first plate along the first axis, wherein the first actuator comprises a first lead screw rotatably supported by the base plate and threadably engaging a portion of the first plate.

18. The image projector of claim 17, wherein the first lead screw is manually actuatable.

19. The image projector of claim 17, wherein the first lead screw is motorized.

20. An image projector comprising:
    a projector housing;
    a light engine supported by the projector housing;
    a projector lens assembly supported by the projector housing, the projector lens assembly having an optical axis and being oriented relative to the light engine for receiving and projecting light emitted thereby;
    a first plate movably coupled to the projector housing and supporting the projector lens assembly, the first plate being selectively movable along a first axis perpendicular to the optical axis;
    a second plate movably supported relative to the first plate and supporting the projector lens assembly thereon such that the second plate travels with the first plate upon movement of the first plate along the first axis, and wherein the second plate is selectively movable relative to the first plate along a second axis that is perpendicular to the optical axis and transverse to the first axis; and
    a second actuator operably connected to the second plate for shifting the second plate along the second axis, wherein the second actuator comprises a second lead screw rotatably supported by the second plate and threadably engaging a portion of the first plate.

21. The image projector of claim 20, wherein the second lead screw is manually actuatable.

22. The image projector of claim 20, wherein the second lead screw is motorized.

23. The image projector of claim 2, further comprising two side plates attached to the base plate.

24. The image projector of claim 23, further comprising a transfer lens assembly mounted on the side plates.

25. The image projector of claim 24, wherein the transfer lens assembly includes a lens plate supported by the side plates and a lens block mounted on an opening of the lens plate.

26. An image projector comprising:
a projector housing;
a light engine supported by the projector housing;
a projector lens assembly supported by the projector housing, the projector lens assembly having an optical axis and being oriented relative to the light engine for receiving and projecting light emitted thereby;
first plate means supporting the projector lens assembly for selectively moving the projector lens assembly along a first axis perpendicular to the optical axis;
second plate means supporting the projector lens assembly for selectively moving the projector lens assembly alone a second axis perpendicular to the optical axis and transverse to the first axis;
glide means between the first plate and the second plate; and
first actuation means operably connected to the first plate means for shifting the first plate means along the first axis.

27. The image projector of claim 26, further comprising:
second actuation means operably connected to the second plate means for shifting the second plate means along the second axis.

28. An apparatus for selectively shifting a projector lens assembly supported by a projector housing and defining an optical axis, the apparatus comprising:
a first plate supporting the projector lens assembly thereon, the first plate being movably supported by the projector housing and selectively movable along a first axis that is perpendicular to the optical axis;
a second plate coupled to the projector housing; and
at least one glide bar between the first plate and the second plate.

29. The image projector of claim 28, wherein the first plate is slidably supported relative to a base plate that is nonmovably supported by the projector housing.

30. The image projector of claim 28, wherein the second plate is movably supported relative to the first plate and supports the projector lens assembly thereon such that the second plate travels with the first plate upon movement of the first plate along the first axis, and wherein the second plate is selectively movable relative to the first plate along a second axis that is perpendicular to the optical axis and transverse to the first axis.

31. The image projector of claim 30, further comprising a first actuator operably connected to the first plate for shifting the first plate along the first axis.

32. The image projector of claim 31, further comprising a second actuator operably connected to the second plate for shifting the second plate along the second axis.

33. The image projector of claim 31, further comprising a first pair of glide bars disposed between a base plate and the second plate parallel to the first axis.

34. The image projector of claim 33, wherein the glide bars are made of self-lubricating material.

35. The image projector of claim 33, wherein the first pair of glide bars is located between a first pair of glide grooves on a surface the base plate and a first pair of glide slots on a first opposing surface of the first plate.

36. The image projector of claim 33, further comprising a second pair of glide bars that are disposed between the first plate and the second plate parallel to the second axis.

37. The image projector of claim 36, wherein the second pair of glide bars is located between a second pair of glide slots on a second surface of the first plate and a pair of glide grooves on an opposing surface of the second plate.

38. The image projector of claim 36, wherein the second plate includes a plurality of fastener slots parallel to the second axis.

39. The image projector of claim 31, wherein the first actuator comprises a first lead screw rotatably supported by the base plate and threadably engaging a portion of the first plate.

40. The image projector of claim 39, wherein the first lead screw is manually actuatable.

41. The image projector of claim 39, wherein the first lead screw is motorized.

42. The image projector of claim 32, wherein the second actuator comprises a second lead screw rotatably supported by the second plate and threadably engaging a portion of the first plate.

43. The image projector of claim 42, wherein the second lead screw is manually actuatable.

44. The image projector of claim 42, wherein the second lead screw is motorized.

45. The image projector of claim 29, further comprising two side plates attached to the base plate.

46. The image projector of claim 45, further comprising a transfer lens assembly mounted on the side plates.

47. The image projector of claim 46, wherein the transfer lens assembly includes a lens plate supported by the side plates and a lens block mounted on an opening of the lens plate.

48. The image projector of claim 28, wherein the first plate is slidably supported relative to the second plate, and the second plate is nonmovably supported by the projector housing.

49. The image projector of claim 28, further comprising a pair of glide bars disposed between the first plate and the second plate parallel to the second axis.

50. The image projector of claim 49, wherein the pair of glide bars is located between a second pair of glide slots on a second surface of the first plate and a pair of glide grooves on an opposing surface of the second plate.

51. An apparatus for selectively shifting a projector lens assembly supported by a projector housing and defining an optical axis, the apparatus comprising:
a first plate supporting the projector lens assembly thereon, the first plate being movably supported by the projector housing and selectively movable along a first axis that is perpendicular to the optical axis, wherein the first plate is slidably supported relative to a base plate that is nonmovably supported by the projector housing;
a second plate movably supported relative to the first plate and supporting the projector lens assembly thereon such that the second plate travels with the first plate upon movement of the first plate along the first axis, and wherein the second plate is selectively movable relative to the first plate along a second axis that is perpendicular to the optical axis and transverse to the first axis, wherein the base plate includes a plurality of fastener slots parallel to the first axis.

52. A method for shifting a projector lens assembly supported by a projector housing and defining an optical axis, the method comprising:
supporting the projector lens assembly in a first plate which is selectively movable along a first axis perpendicular to the optical axis;

coupling the first plate to a second plate oriented relatively to a light engine supported in the projector housing such that the second plate travels with the first plate when the first plate moves along the first axis, and wherein the second plate is selectively movable relative to the first plate along a second axis that is perpendicular to the optical axis and transverse to the first axis;

supporting a first pair of glide bars between the first plate and a base plate connected to the projector housing; and supporting a second pair of glide bars between the first plate and the second plate.

* * * * *

UNITED STATES PATENT AND TRADEMARK OFFICE
CERTIFICATE OF CORRECTION

PATENT NO. : 6,755,540 B1
DATED : June 29, 2004
INVENTOR(S) : Virgil Sam Runco

It is certified that error appears in the above-identified patent and that said Letters Patent is hereby corrected as shown below:

Column 2,
Line 1, delete "of second plate" and substitute therefor -- of the second plate --.

Column 4,
Line 25, delete "nonmovably" and substitute therefor -- non-movably --.
Line 50, delete "may threaded" and sustitute therefor -- may be threaded --.
Line 51, delete "feed" and substitute therefor -- fed --.
Line 55, delete "kill" and substitute therefor -- skill --.

Column 7,
Line 2, delete "description, limit" and substitute therefor -- description, therefore, is not meant to limit --.
Line 3, delete "invention is the appended" and substitute therefor -- invention is to be determined only by the appended --.
Line 18, delete "slide" and substitute therefor -- glide --.

Column 8,
Line 9, delete "housing the" and substitute therefor -- housing, the --.

Column 9,
Line 15, delete "alone" and substitute therefor -- along --.

Column 11,
Line 1, delete "relatively" and substitute therefor -- relative --.

Signed and Sealed this

Twenty-second Day of February, 2005

JON W. DUDAS
*Director of the United States Patent and Trademark Office*